June 19, 1928.
J. C. GIPE
1,673,910
GLASS SURFACING APPARATUS
Filed Feb. 15, 1926    2 Sheets-Sheet 1
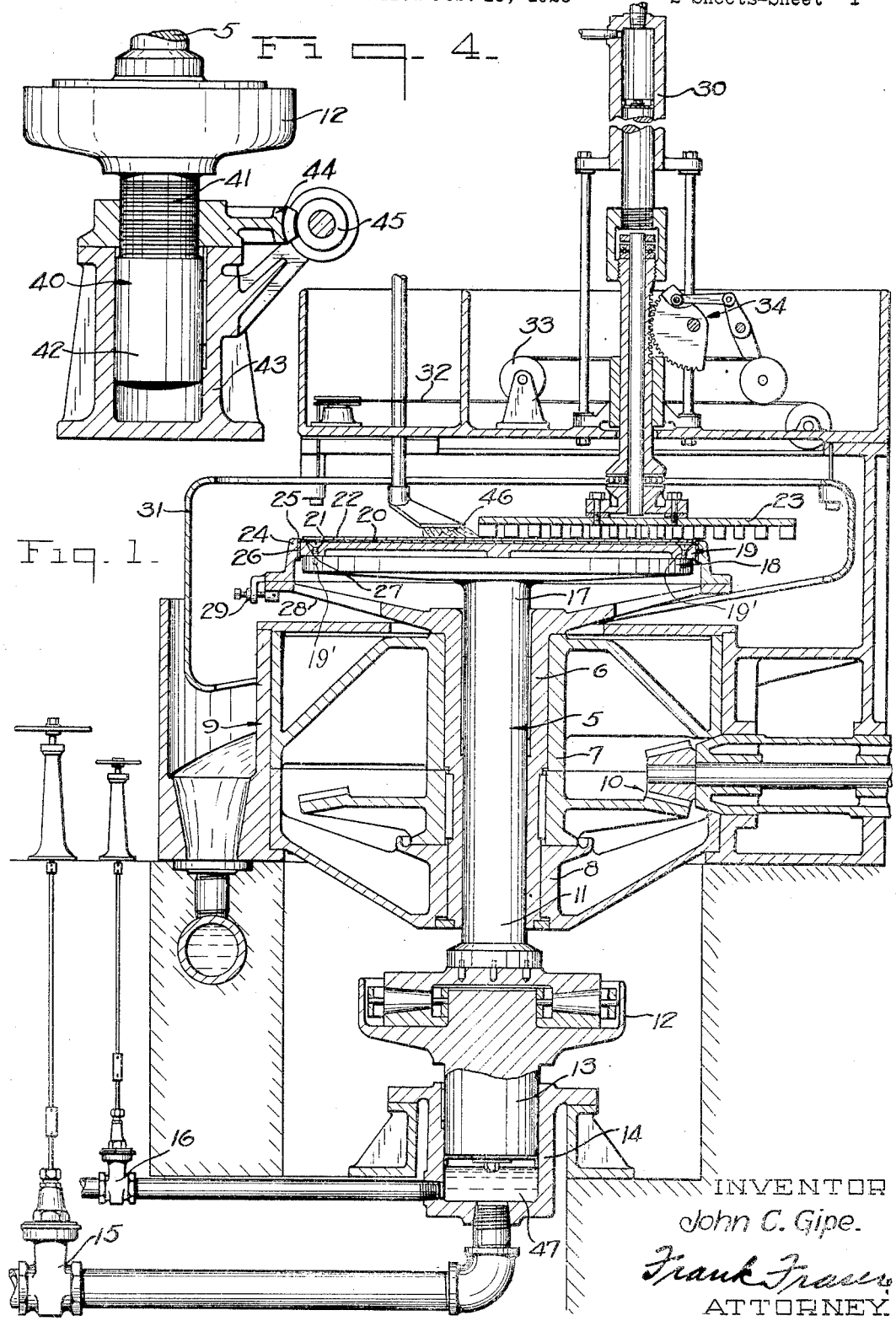
INVENTOR
John C. Gipe.
Frank Fraser
ATTORNEY

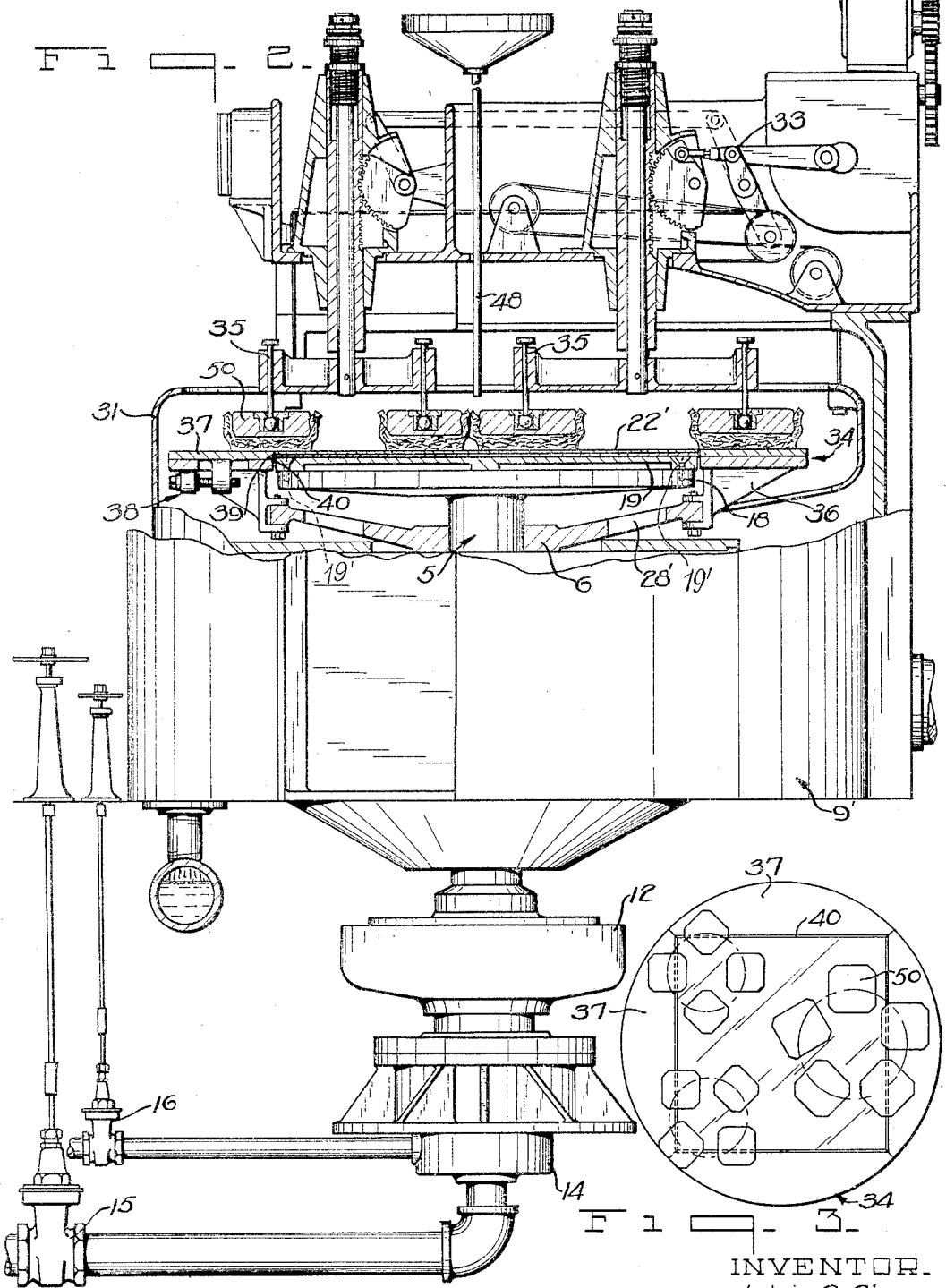

Patented June 19, 1928.

1,673,910

UNITED STATES PATENT OFFICE.

JOHN C. GIPE, OF TOLEDO, OHIO, ASSIGNOR TO THE LIBBEY-OWENS SHEET GLASS COMPANY, OF TOLEDO, OHIO, A CORPORATION OF OHIO.

GLASS-SURFACING APPARATUS.

Application filed February 15, 1926. Serial No. 88,222.

The present invention relates to improvements in apparatus for surfacing sheets of glass.

An object of the present invention is to provide a glass surfacing apparatus with means whereby glass sheets may be loosely supported therein while being surfaced.

Another object of the invention is to provide a glass surfacing apparatus with means whereby the means which holds and supports the glass sheets may be adapted to accommodate glass sheets of different thicknesses.

A further object of the invention is to provide a glass surfacing apparatus with means which will facilitate the setting or removal of glass sheets to and from the means supporting and holding them.

Further objects and advantages of the invention will become apparent during the course of the following description.

In the drawings wherein like numerals are employed to designate like parts throughout the same, Fig. 1 is a central vertical section through a glass sheet surfacing apparatus in which glass sheets are positioned for grinding, showing the improved device.

Fig. 2 is an elevation, partly in section, of a glass surfacing apparatus, in which glass sheets are positioned for polishing after being ground, showing the improved device.

Fig. 3 is a plan of the polishing table in Fig. 2, showing polishing blocks diagrammatically arranged thereon.

Fig. 4 is a modification of the improved device shown in Figs. 1 and 2.

In the drawings the numeral 5 refers to a long vertical column slidably keyed in a sleeve bearing 6, which is rotatably mounted in bearings 7 and 8 of a framework 9. The sleeve bearing may be rotatably driven by means of a set of bevel gears 10 which are connected to some convenient form of drive, and the column 5 is in turn driven by the sleeve 6 to which it is keyed. The vertical column 5 is preferably supported on its lower end 11 in a roller step bearing 12, whose piston 13 is adapted to operate within a suitably anchored cylinder 14 in which is maintained a suitable amount of fluid under pressure, by proper manipulation of an inlet valve 15 and an outlet valve 16.

Secured to the upper end 17 of the column 5 is a table 18 upon which is suitably mounted a glass supporting member 19 secured to said table 18 by means of suitable bolts 19' and whose upper surface 20 is accurately machined to substantially a true and common level. It is important that this upper surface be substantially true and level because it initially serves as a master surface for producing perfect lights of plate glass. This upper or master surface 20 is covered with a cushion 21 of some suitable material that will not mar or scratch the lower surface of the glass sheet 22 freely positioned thereon. It is quite important that the cushion 21 be substantially equal in thickness throughout in order to permit the master surface upon which it rests to be registered as near as possible upon the glass sheet 22.

Due to centrifugal force caused by the rotation of the table 18, together with the action created by the surfacing tool 23 when in engagement with the glass, there will be a tendency upon the part of the glass sheet 22 to either flounder laterally about upon the surface of or be thrown entirely from the table. In order to prevent this undesirable condition, the lateral movement of the glass sheet may be limited by a ledge or retainer 24 erected around the perimeter of the table and having its inner face 25 suitably covered with a cushion 26 of suitable material to prevent chipping or breaking of the glass sheets at the edges 27 when coming in contact therewith. The retainer 24 may be constructed in one piece or in sections, and is preferably mounted on arms 28 radially extending from the rotatable sleeve 6. If in sections, the separate sections may be adapted for lateral adjustment by means of the screw mechanism 29.

The surfacing or grinding tool 23 is of the type ordinarily used for grinding glass, and has associated therewith a pressure regulating device 30 which maintains a constant predetermined pressure between the grinding tool and the glass sheet 22, during the surfacing operation. This device is suitably connected to a protecting door 31 by cables 32, pulleys 33 and the crank and lever arrangement 34. When it is desired to raise the grinding tool out of engagement with the glass, the pressure is released in the device 30 and the door 31 automatically lowers, being of sufficient weight to simultaneously raise the surfacing tool 23, more fully disclosed in my copending application, Serial No. 41,039, filed July 2, 1925.

The surfacing apparatus illustrated in Fig. 2 is identical in design to that shown in Fig. 1, except for the type and arrangement of the surfacing tools 50. The surfacing tools used in connection with this apparatus are of the type ordinarily used for polishing glass after it has been ground, and are adapted to move either to or from engagement with the glass by the raising and lowering mechanism 33. The protecting door 31' is associated with the surfacing tools in a manner similar to that previously mentioned, being automatically raised when the tools are lowered and vice-versa. This type and arrangement of surfacing tools makes necessary a different type of ledge or retainer 34 than shown in Fig. 1, to limit the lateral movement of the glass sheet 22' on the table, as the tools are free to move vertically on their spindles 35. This ledge comprises a member 36 bolted to the arms 28' of the rotatable sleeve 6', said member being adapted to receive tool supporting sections 37 which may be laterally adjusted by means of the screw mechanism 38. The inner faces 39 of the tool supporting sections 37 are covered with a suitable cushion 40 to prevent the edges of the sheet from being chipped or broken when coming in contact therewith. A ledge or retainer constructed in this manner will prevent the polishing tools from extending either too far below or above the level of the glass sheet 22' during the polishing operation.

The apparatus as illustrated in Fig. 1 is shown during the operation of grinding a sheet of glass 22, that is, the glass is in position on the rotating table 18, and the grinding tool 23 lowered into engagement with the glass, and the abrasive 46 is being supplied thereto. Prior to this operating arrangement of the parts, it is necessary to suitably set the glass sheet 22 on the glass supporting member 19 and within the retainer or ledge 24. Before setting the glass, the surfacing tool 23 must be in elevated position, the protecting door 31 in lowered position, the supply of the abrasive 46 cut off, and the table and retainer stationary. Then in order to set the glass sheet, in accordance with the present invention, on the improved glass supporting table, a fluid 47, under pressure, is permitted to enter the cylinder 14 in which the piston 13 operates, by opening the valve 15, thus causing the table to be raised within the stationary retainer 24. When sufficient fluid has entered the cylinder to cause the cushion 21 on the glass supporting member 19 to be extended a desired distance above the retainer, the valve 15 is closed (the valve 16 is normally closed), thus leaving the table in elevated position. The glass sheet 22, previously cut to the proper size, is then placed on the cushion 21. The table 18 is then ready to be lowered into its rotatable position within the retainer 24. This is done by opening the valve 16 which allows a portion of the fluid 47 in the cylinder to be expelled therefrom, thus permitting the table to lower gradually and to a desired position within the retainer. The table and glass sheet are lowered into the retainer until about one-half the thickness of the glass extends above the top of the ledge or retainer 24, and then the valve 16 is closed. The glass sheet 22 is thus supported in a cushioned recess formed by the table and retainer. The glass is then started to slowly rotate and the abrasive 46 is supplied thereto while the grinding tool 23 is lowered into engagement with it by the pressure regulating device 30 until a desired pressure between it and the glass is attained. In order to maintain a more steady pressure of the tool on the table and in the cylinder 14, there may be connected therewith some suitable type of accumulator ordinarily used in connection with devices of this nature.

The apparatus as illustrated in Fig. 2 is shown during the operation of polishing a sheet of glass 22', that is, the glass is in position on the rotating table 18, the polishing tools 32 are lowered into engagement with the glass and rouge is intermittently supplied to the glass surface through a suitable feed pipe 48. The procedure for setting the sheet in this case is similar to that which has been described in connection with setting it for the grinding operation, except that the glass is lowered into the retainer until its upper surface is substantially on the same level plane as the tool supporting members 37, which form a part of the retainer or ledge 34. The pressure required between the glass and the polishing tools or blocks for polishing the glass is dependent upon the weight of each block in itself.

When it is desired to remove the glass sheet from the surfacing apparatus, in accordance with the present invention, the rotation thereof is stopped, surfacing tools raised out of engagement therewith, protecting door lowered, and the supply of polishing or grinding agent is cut off. The table carrying the glass is raised out of its retainer, and then the glass sheet may be bodily slid therefrom. In case it is desired to maintain the table setting which has already been adjusted to accommodate one thickness of glass, the glass sheets may be removed in the usual manner by employing the use of either the screw mechanism 29 or 38, which laterally adjusts the sections of the respective retainers 24 and 34.

The modification shown in Fig. 4 illustrates another manner for raising or lowering the table 18. The step bearing 12, carrying the table 18, is provided with an extension 40 which is threaded at its upper end 41, the lower end 42 thereof being keyed to and adapted to slide vertically within a supporting guide 43. Resting upon the supporting guide 43, and screw-threadedly mounted on the threaded portion of the column is a worm wheel segment 44 which is adapted to mesh with a worm 45. By rotating the worm in the desired direction the table 18 may thus be either raised or lowered.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In a sheet glass surfacing apparatus, comprising a rotatable sheet supporting table, a cushion associated with the table upon which the glass sheet rests, a sheet retainer forming an elevated ledge around and apart from the table and cushion, and means for raising or lowering as a unit the table, cushion and glass sheet within said retainer.

2. In a sheet glass surfacing apparatus, comprising a rotatable sheet supporting table, a cushion associated with the table upon which the glass sheet rests, a rotatable sheet retainer forming an elevated ledge around but apart from the table and cushion, and means for adjusting the table up and down within said retainer.

3. In a sheet glass surfacing apparatus, rotatable means for supporting the glass, a cushion upon said means upon which the glass may freely rest, a ledge which is adapted to extend above or below the upper surface of said cushion, and surrounding but apart from said glass supporting means, and means for rotating the glass supporting means and ledge as a unit.

4. In a sheet glass surfacing apparatus, a rotatable table for supporting the glass, a cushion associated with the table upon which the glass freely rests, and a ledge around the table which is adapted to extend either below or above the upper surface of said cushion on the table.

5. In a sheet glass surfacing apparatus, a rotatable table, a cushioned "master plate" associated with the table upon which the glass freely rests, means surrounding said glass which will constrain it to remain on the plate when rotated, and means for adjusting the table to move the glass either up or down within aforesaid means.

6. In combination with a cushioned "master plate" adapted to support sheets of glass, and a cushioned ledge apart from said plate to limit the lateral movement of the glass on the plate, of a rotatable table for supporting the plate, a supporting means for said cushioned ledge, a supporting means for said table, including a column, a roller step bearing adapted to receive said column, a cylinder, a piston attached to said bearing and adapted to operate within said cylinder, means to create a pressure within the cylinder sufficient to adjust the vertical location of said table, and means for rotating the table and ledge.

7. In sheet glass surfacing apparatus, a rotatable table having a flat upper surface for supporting the sheet, a sheet retainer forming an elevated ledge around the table, and means for raising and lowering the table and sheet within said sheet retainer.

8. In sheet glass surfacing apparatus, a rotatable table having a flat upper surface for supporting the sheet, means surrounding the sheet which will constrain it to remain on the flat surface of the table when rotated, and means for adjusting the table to move the glass either up or down within the first means.

9. In sheet glass surfacing apparatus, a rotatable table, a cushion associated with the table upon which the glass sheet rests, a sheet retainer forming an elevated ledge around the table and cushion, and hydraulic means for suitably positioning the table and glass and maintaining the same in position within the retainer.

Signed at Toledo, in the county of Lucas and State of Ohio, this 10th day of February, 1926.

JOHN C. GIPE.